(12) United States Patent
Kao

(10) Patent No.: US 7,901,476 B2
(45) Date of Patent: Mar. 8, 2011

(54) PEAKY FILTER

(76) Inventor: Ying-Shou Kao, Sanshia Jen (TW)

( * ) Notice: Subject to any disclaimer, the term of this patent is extended or adjusted under 35 U.S.C. 154(b) by 49 days.

(21) Appl. No.: 11/826,044

(22) Filed: Jul. 11, 2007

(65) Prior Publication Data

US 2010/0229515 A1 Sep. 16, 2010

(51) Int. Cl.
*B01D 46/06* (2006.01)
*B01D 46/52* (2006.01)

(52) U.S. Cl. .......... 55/379; 55/378; 55/492; 55/495; 55/521; 55/DIG. 31; 210/479; 210/493.1; 210/493.5; 210/497.01

(58) Field of Classification Search .......... 55/341.1, 55/378, 379, 380, 492, 495, 497, 500, 521; 55/DIG. 31; 210/479, 493.1, 493.5, 497.01
See application file for complete search history.

(56) References Cited

U.S. PATENT DOCUMENTS

| | | | | |
|---|---|---|---|---|
| 3,830,042 A * | 8/1974 | MacDonnell | ............... | 55/341.4 |
| 4,123,239 A * | 10/1978 | Andersson et al. | ............. | 55/379 |
| 4,129,428 A * | 12/1978 | Andersson et al. | ............. | 55/379 |
| 4,141,704 A * | 2/1979 | Berglund | .................. | 55/379 |
| 4,187,091 A * | 2/1980 | Durre et al. | ................. | 55/499 |
| 4,746,339 A * | 5/1988 | Millard | ....................... | 55/302 |
| 4,878,930 A * | 11/1989 | Manniso et al. | ............... | 55/493 |
| 5,558,689 A * | 9/1996 | Yanagihara et al. | ........... | 55/492 |
| 7,097,681 B2 * | 8/2006 | Kao | ........................... | 55/363 |
| 7,371,267 B2 * | 5/2008 | Pipkorn et al. | .................. | 55/379 |
| 2004/0250518 A1 * | 12/2004 | Kao | .................. | 55/379 |
| 2007/0119132 A1 * | 5/2007 | Ikeno et al. | .................... | 55/492 |

* cited by examiner

*Primary Examiner* — Michael A Marcheschi
*Assistant Examiner* — Robert A Clemente
(74) *Attorney, Agent, or Firm* — Muncy, Geissler, Olds & Lowe, PLLC

(57) ABSTRACT

A peaky filter comprises a covering and a corresponding base, a supporting frame connected between the covering and the base, and a multifold filter covering the exterior of the supporting frame. The supporting frame includes plural transversely spaced first supports and plural connectors. Each support has a supporting rod and a plurality of longitudinally spaced supporting members connected to the supporting rod. Each supporting member has a first supporting leg and a second supporting leg extending radially and outwardly from the supporting rod. Each connector has a first connecting part and a second connecting part, which are used for respectively connecting one end of the first supporting leg of one support and one end of the second supporting leg of another adjacent support to connect elastically the plurality of transversely spaced supports, and consequently alter the size of the supporting frame and the filtering area of the filter.

8 Claims, 4 Drawing Sheets

PEAKY FILTER

BACKGROUND OF THE INVENTION

1. Field of the Invention

The present invention relates to a filter and, more particularly, to a peaky filter by means of a plurality of connectors for flexibly adjusting the number of supports and thus alter the size of a supporting frame and filtering area of a filter.

2. Description of the Prior Art

With the rapid development in the industrial and commercial society, environmental pollution is getting worse. Because human beings haven't taken effective measures to improve the environment while natural calamities has resulted in the change of ecological environment, which threatens lives of human beings.

There are many sources causing air pollution. Waste gas is produced mainly from factories in addition to transportation vehicles. To reduce effectively the amount of waste gas, the method adopted recently is to use a processor for releasing into air only the waste gas where the amount of pollutants are lower than the standard values.

Waste gas mainly contains granular or gaseous pollutants, which have to be processed in different ways. For example, when waste gas containing granular pollutants is to be processed, a dust collector is usually used in the field. The dust collector is provided with a bag filter therein for separating gas and micro granules after the waste gas is suctioned into the dust collector. The micro granules are filtered, collected and thrown away, or reused, and the gas is released via a venting apparatus.

In practice, the bag filter can be in rectangular or cylindrical shape when used in different dust collectors. Structurally, the bag filter comprises a supporting frame of rectangular or cylindrical shape and on the exterior of the supporting frame is covered with a filter. Although the described structure can be used for separating gas from micro granules effectively, there are still several disadvantages need to be improved.

1. Covering a filter on the exterior of the rectangular or cylindrical supporting frame occupies quite large space when in practice.

2. After the supporting frame is assembled as a fixed supporting structure, it is inconvenient that the supporting frame only can be destructed first before reassembled when there is a need to reassemble it.

3. Different dust collectors need bag filters of different size or shape and different bag filters need to be manufactured by machines of different specifications. The cost is elevated correspondingly.

4. When the bag filter has been used for a long time and needs to be replaced, it is inconvenient for users to replace the bag filter because the filter is positioned on the exterior of the supporting frame via superposition. It is not economical in operation.

In order to overcome the shortcomings mentioned above to provide a peaky filter, which occupies less space in the condition that the filtering area is maintained, can be manufactured flexibly according to different specification requirements in lower manufacturing cost, and can be easily to be replaced, inventor had the motive to study and develop the present invention after hard research.

SUMMARY OF THE INVENTION

An object of the present invention is to provide a peaky filter, wherein a plurality of transversely spaced supports is connected by a plurality of connectors, so that the number of supports can be flexibly adjusted to be used in dust collectors with different specifications, and the manufacturing cost can be lowered correspondingly.

Another object of the present invention is to provide a peaky filter, wherein the filter is in multifold shape and positioned on the exterior of the supporting frame for occupying less space while the total filtering area is maintained.

A further object of the present invention is to provide a peaky filter, wherein two ends of a plurality of positioning rods are connected with upper and lower positioning pieces respectively for fastening or releasing the two ends of the filter, so that the filter can be easily replaced to save operation cost.

In order to achieve the above objects, the present invention provides a peaky filter comprising a covering and a corresponding base, a supporting frame, and a filter. The covering is provided with an air vent. The supporting frame is disposed between the covering and the base and includes a plurality of transversely spaced first supports and a plurality of connectors. Each support has a supporting rod and a plurality of supporting members longitudinally spaced and connected to the supporting rod. The supporting member has a first supporting leg and a second supporting leg outwardly and radially from the supporting rod. Each connector has a first connecting part and a second connecting part for respectively connecting one end of the first supporting leg of one support and one end of the second supporting leg of another adjacent support. The filter is in multifold shape and positioned on the exterior of the supporting frame.

In practice, the connectors are in U-shape or H-shape.

In practice, the present invention further includes a plurality of transversely spaced positioning rods for connecting the longitudinally spaced connectors respectively. The two ends of each positioning rod are connected with an upper and lower positioning pieces for fixing the filter.

In practice, the upper and lower ends of the filter are disposed with at least one pressing sheet respectively, and the upper and lower positioning pieces are springs for pushing the connector to press against and fix each pressing sheet.

The following detailed description, given by way of examples and not intended to limit the invention solely to the embodiments described herein, will best be understood in conjunction with the accompanying drawings.

DETAILED DESCRIPTION OF THE PREFERRED EMBODIMENTS

Figure 1:
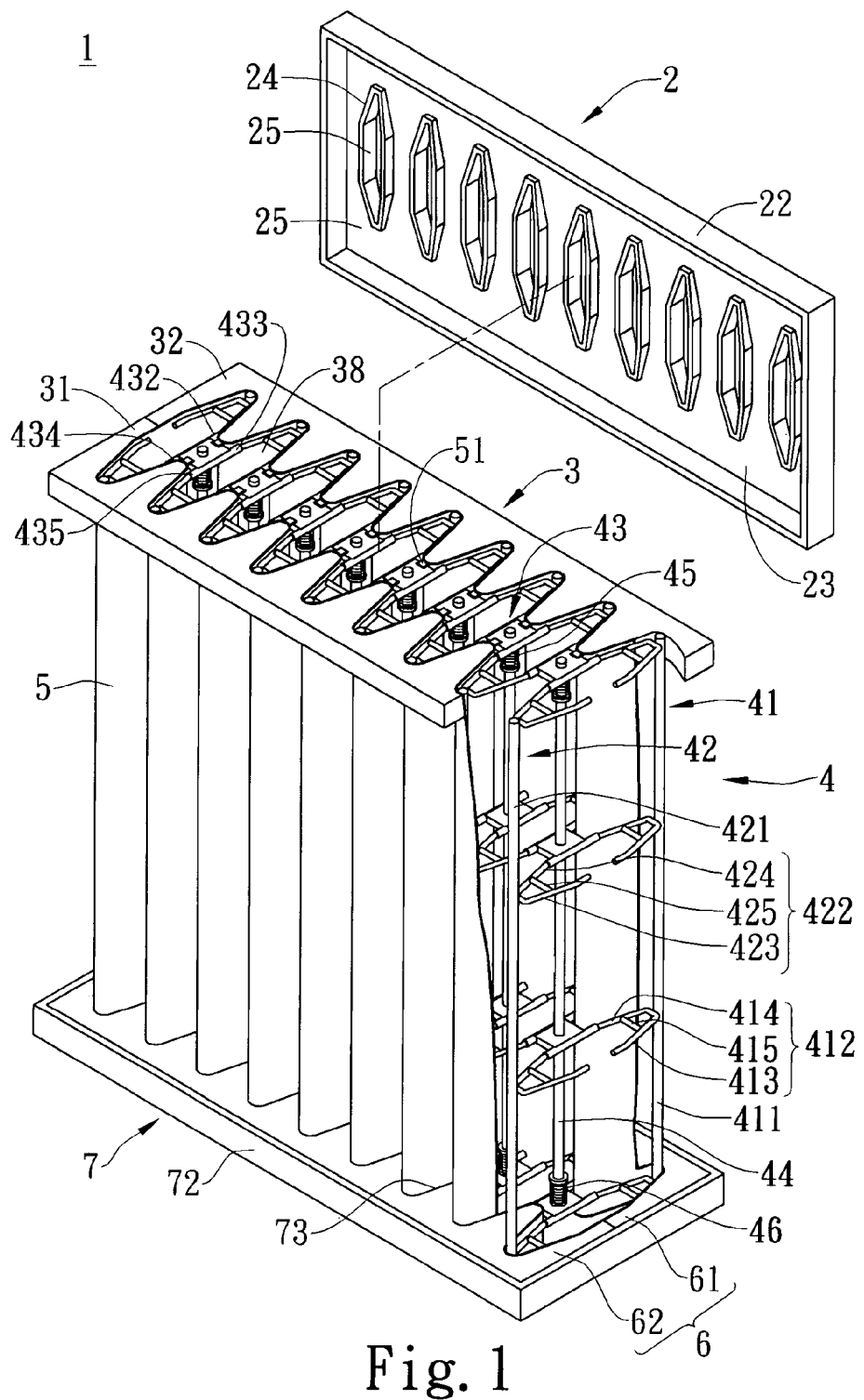
FIG. 1 is a perspective schematic diagram of a first embodiment of the present invention.
Figure 2:
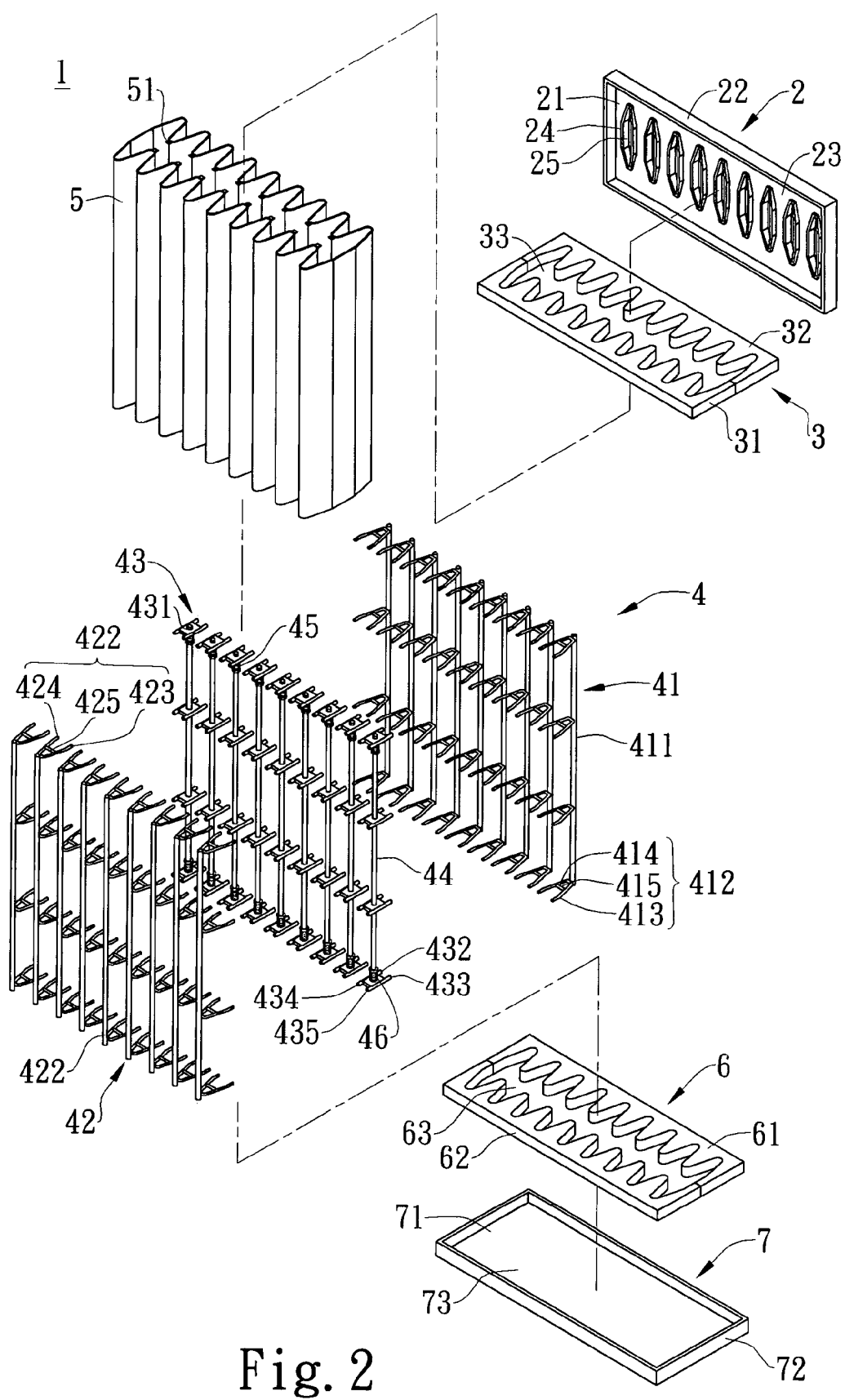
FIG. 2 is an exploded view of the present invention.
Figure 3:
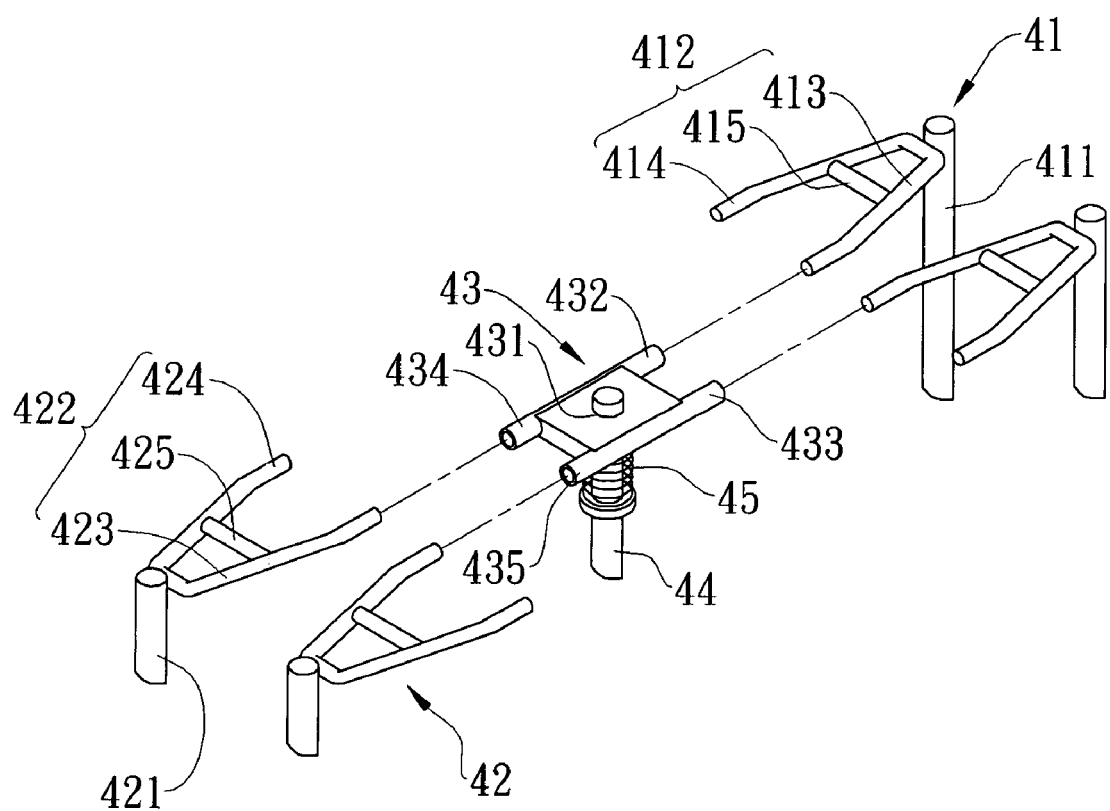
FIG. 3 is a locally enlarged diagram showing a first and a second supports and a connector in the first embodiment.

FIGS. 1-3 show a first embodiment of the present invention providing a peaky filter 1 comprising a covering 2 and a corresponding base 7, an upper airtight layer 3, a supporting frame 4, a filter 5, and a lower airtight layer 6.

The covering 2 is a rectangular open casing formed by a top plate 21 and four lateral plates 22 extending downward from the top plate 21 and a space 23 is formed therein. A plurality of closed and spaced plate-form positioning parts 24 extends downward from the bottom of the top plate 21. One positioning part 24 has a hole as an air vent 25 connected with a venting apparatus. The base 7 is a rectangular open casing formed by a bottom plate 71 and four lateral plates 72 extending upward from the bottom plate 71 and a space 73 is formed therein.

The upper and the lower airtight layer 3,6 are preferably made by rubber. The upper airtight layer 3 is located within the space 23 of the covering 2 while the lower airtight layer 6 is located within the space 73 of the base 7. The upper and lower airtight layers 3,6 are composed of two corresponding plates 31,32,61,62 respectively. Multi-fold open channels 33,63 are formed respectively by assembling the plates 31,32, 61,62. The open channel of the upper airtight layer 3 is inserted by the positioning part 24 of the covering 2. In practice, the upper and lower airtight layers can be made by, but not limited to, foam resin or other fillers having airtight capability.

The upper and lower ends of the supporting frame 4 are extending through the open channels 33,63 of the upper and lower airtight layers 3,6 respectively to be connected between the covering 2 and the base 7. The supporting frame 4 includes a plurality of transversely spaced first supports 41, a plurality of second supports 42 disposed correspondingly to the first supports 41, a plurality of connectors 43, and a plurality of transversely spaced positioning rods 44. Each first or second support 41,42 includes a supporting rod 411,421 and a plurality of longitudinally spaced supporting members 412,422 is connected to the supporting rods 411,421. Each supporting member 412,422 has a first supporting leg 413, 423 and a second supporting leg 414,424 extending from the supporting rods 411,421 outwardly and radially. The first and second supporting legs 413,423,414,424 are interconnected by a rod 415,425 to be in A-shape. Each connector 43 is in H-shape and has a positioning hole centrally. Besides, each connector 43 includes a first connecting part 432 and a second connecting part 433 that are parallel and tubular, and a third connecting part 434 and a fourth connecting part 435 that are disposed inversely relative to the first and the second connecting parts 432,433. The positioning rod 44 is inserted through each positioning hole 431 of the longitudinally spaced connectors 43 for connecting the connectors 43. In addition, two ends of the positioning rod 44 are connected with an upper positioning piece 45 and a lower positioning piece 46 respectively. In this embodiment, the upper and lower positioning pieces 45,46 are springs that are connected with the two ends of the positioning rod 44 respectively. One end of each spring is connected with the positioning rod 44 and another end is against the connector 43.

The filter 5 is in multifold shape and covers the exterior of the supporting frame 4. The upper and lower ends of the filter 5 are provided with at least a pressing sheet 51 respectively.

In assembly, one end of the first supporting legs 413 of the plurality of supporting members 412 of one first support 41 is inserted through the first connecting part 432 of each connector 43 while one end of the second supporting legs 414 of the plurality of supporting members 412 of another adjacent first support 41 is inserted through the second connecting part 433 of each connector 43 to form a multifold structure with continuous wave crests and wave troughs. Besides, one end of the first supporting legs 423 of the plurality of supporting members 422 of one second support 42 is inserted through the third connecting part 434 of each connector 43 while one end of the second supporting legs 424 of the plurality of supporting members 422 of another adjacent second support 42 is inserted through the fourth connecting part 435 of each connector 43 to form another corresponding multifold structure with continuous wave crests and wave troughs.

When a supporting frame 4 is assembled, the upper and lower ends of each supporting rod 411,421 are welded to the bottom side of the top plate 21 of the covering 2 and the topside of the bottom plate 71 of the base 7. The multifold filter 5 covers the exterior of the supporting frame 4. The pressing sheets 51 disposed on the upper end of the filter 5 respectively extend between the bottom side of the top plate 21 of the covering 2 and each connector 43 against the bottom side. The pressing sheets 51 disposed on the lower end of the filter 5 respectively extend between the topside of the bottom plate 71 of the base 7 and each connector 43 against the topside. Therefore, each connector 43 is pushed by the elastic force produced by the upper and lower positioning members 45,46 for pressing against or releasing each pressing sheet 51. Finally, the upper and lower airtight layers 3,6 are put in and the covering 7 and the base 7 are connected thereto.

Figure 4:
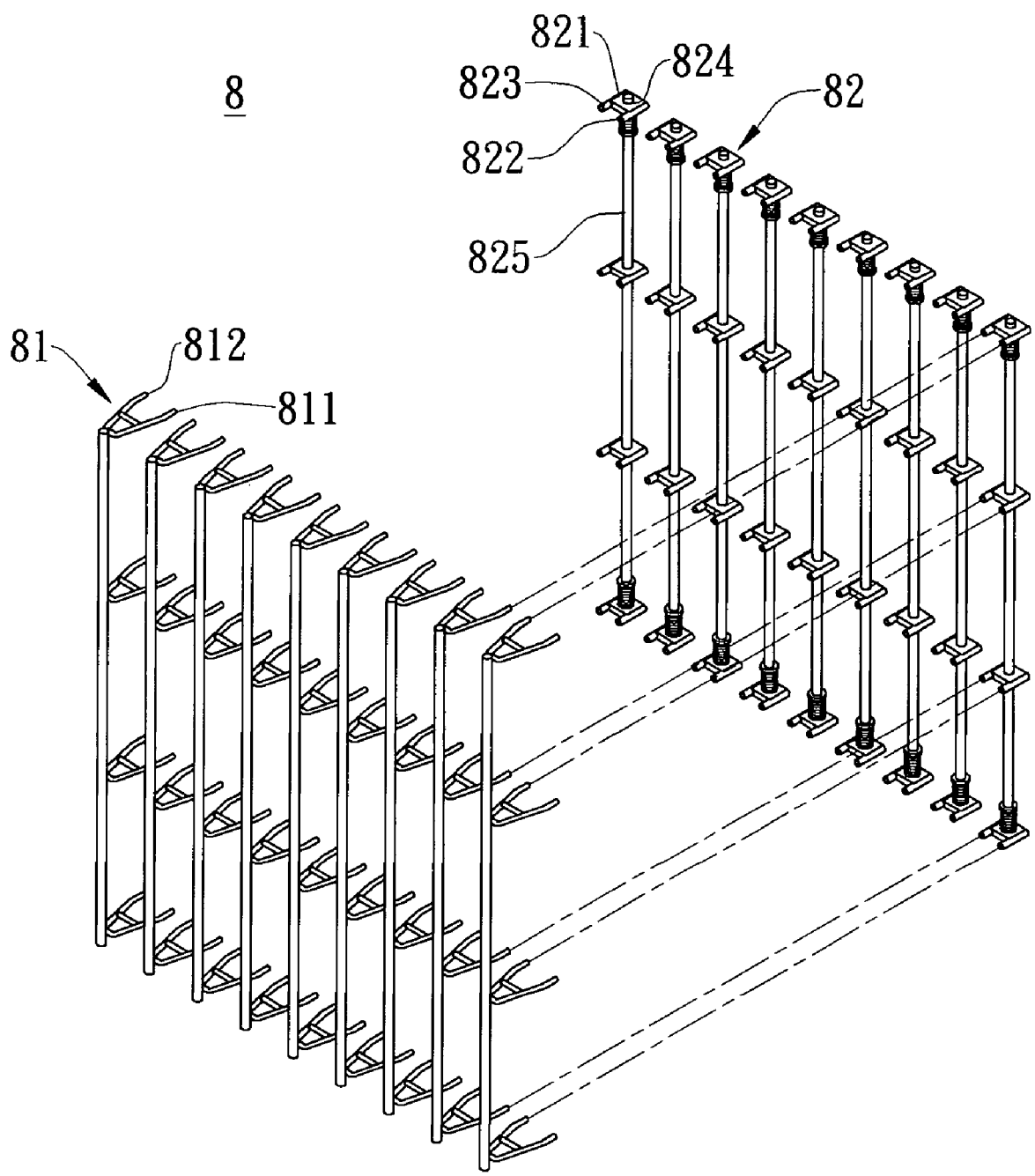
FIG. 4 is an exploded view of a supporting frame in a second embodiment of the present invention.

As shown in FIG. 4, a second embodiment of the present invention is depicted. A supporting frame 8 includes a plurality of transversely spaced first supports 81 and a plurality of connectors 82. The connectors 82 are in U-shape. Each connector 82 includes a bottom part 821 and a first connecting part 822 and a second connecting part 823, where the two connecting parts 822,823 extend vertically from the two ends of the bottom part 821 and are parallel. The bottom part 821 is provided with a positioning hole 824 for inserting a positioning rod 825. The first connecting part 822 and the second connecting part 823 of each connector 82 are used for correspondingly connecting one end of a first supporting leg 811 of one support 81 and one end of a second supporting leg 812 of another adjacent first support 81, so that the filter (not shown in this figure) is supported and filtering effect can be achieved.

Thereby, the present invention has the following advantages:

1. According to the present invention, it is able to adjust flexibly the number of supports, make the whole assembly smaller, and reduce the manufacturing cost correspondingly.
2. Under the condition that the filtering area is maintained, the peaky filter according to the present invention occupies less space and the filtering efficiency can be greatly elevated.
3. According to the present invention, the filter can be easily replaced to reduce the replacing cost.
4. According to the present invention, the upper and lower airtight layers can effectively separate the waste gas from the filtered gas to make the present invention more efficient in use.

Accordingly, as disclosed in the above description and attached drawings, the present invention can provide a peaky filter, which occupies less space in the condition that the filtering area is maintained, can be manufactured flexibly according to specification requirement in lower manufacturing cost, and can be easily replaced. It is new and can be put into industrial use.

It should be understood that different modifications and variations could be made from the disclosures disclosed above by the people familiar in the art, without departing the spirit of the present invention.

What is claimed is:

1. A peaky filter, comprising:
    a covering and a corresponding base, where the covering is provided with an air vent;
    a supporting frame connected between the covering and the base, including a plurality of transversely spaced first supports and a plurality of connectors, wherein each support has a supporting rod and a plurality of supporting members longitudinally spaced and connected to the supporting rod, and the supporting member has a first supporting leg and a second supporting leg extending radially and outwardly; each connector has a first connecting part and a second connecting part for respectively connecting one end of the first supporting leg of one support and one end of the second supporting leg of another adjacent support; and a filter in multifold shape and positioned on the exterior of the supporting frame.

2. The peaky filter as claimed in claim 1, wherein the connectors are in U-shape.

3. The peaky filter as claimed in claim 1, wherein the connector further includes a third and a fourth connecting parts, which are disposed inversely relative to the first and the second connecting parts, so that the connector is formed in H-shape.

4. The peaky filter as claimed in claim 3 further including a plurality of second supports corresponding to the first supports, where first supporting legs of the adjacent second supports are connected with the third and the fourth connecting parts respectively.

5. The peaky filter as claimed in claim 1 further including an upper airtight layer and a lower airtight layer, wherein the upper airtight layer is fixed between the upper end of the filter and the covering while the lower airtight layer is fixed between the lower end of the filter and the base.

6. The peaky filter as claimed in claim 1 further including a plurality of transversely spaced positioning rods for connecting the longitudinally spaced connectors respectively.

7. The peaky filter as claimed in claim 6 further including at least one upper positioning piece and at least one lower positioning piece for connecting the two ends of each positioning rod to position the filter.

8. The peaky filter as claimed in claim 7, wherein the upper and lower ends of the filter are disposed with at least one pressing sheet respectively, and the upper and lower positioning pieces are springs for pushing the connector to press against and fix each pressing sheet.

\* \* \* \* \*